United States Patent
Thomas et al.

(10) Patent No.: US 12,483,086 B2
(45) Date of Patent: Nov. 25, 2025

(54) INDUCTION MOTOR

(71) Applicant: Entuple E-Mobility Pvt Ltd, Bangalore (IN)

(72) Inventors: Tijo Thomas, Trivandrum (IN); Vitthal Shreepad Deexit, Bangalore (IN); Deshmukh Laxman Vitthalrao, Parbhani (IN)

(73) Assignee: Entuple E-Mobility Pvt Ltd (IN)

(*) Notice: Subject to any disclaimer, the term of this patent is extended or adjusted under 35 U.S.C. 154(b) by 242 days.

(21) Appl. No.: 18/259,284

(22) PCT Filed: Dec. 24, 2021

(86) PCT No.: PCT/IB2021/062297
§ 371 (c)(1),
(2) Date: Jun. 26, 2023

(87) PCT Pub. No.: WO2022/137211
PCT Pub. Date: Jun. 30, 2022

(65) Prior Publication Data
US 2024/0063684 A1    Feb. 22, 2024

(30) Foreign Application Priority Data

Dec. 24, 2020    (IN) ............................. 202041056387

(51) Int. Cl.
| | | |
|---|---|---|
| *H02K 5/20* | (2006.01) | |
| *H02K 7/04* | (2006.01) | |
| | *H02K 9/06* | (2006.01) |
| | *H02K 9/19* | (2006.01) |
| | *H02K 17/16* | (2006.01) |
| | *H02K 17/18* | (2006.01) |
| | *H02K 17/20* | (2006.01) |

(52) U.S. Cl.
CPC ............. *H02K 5/203* (2021.01); *H02K 5/207* (2021.01); *H02K 7/04* (2013.01); *H02K 9/06* (2013.01);
(Continued)

(58) Field of Classification Search
CPC .......... H02K 1/185; H02K 1/265; H02K 1/28; H02K 17/168; H02K 17/18; H02K 17/20;
(Continued)

(56) References Cited

U.S. PATENT DOCUMENTS

| | | |
|---|---|---|
| 8,970,075 B2 | 3/2015 | Rippel et al. |
| 10,177,630 B2 | 1/2019 | Luise et al. |

(Continued)

FOREIGN PATENT DOCUMENTS

CN    102624150 A  *  8/2012

*Primary Examiner* — Christopher M Koehler
*Assistant Examiner* — Ethan Nguyen Vo
(74) *Attorney, Agent, or Firm* — Jason C. Cameron

(57) ABSTRACT

An induction motor is disclosed. The induction motor comprises a motor casing, fabricated in an irregular octagonal shape with a central open area. The motor casing is configured to house a cooling system within an outer wall and an inner wall of the motor casing. The cooling system comprises a plurality of interconnected cooling channels and a plurality of air ducts. The induction motor comprises a stator assembly housed within the central open area of the motor casing, a rotor assembly fitted inside the stator assembly and a shaft configured to be fitted to the rotor assembly. The induction motor also comprises a fan positioned on the first axial end of the induction motor. The fan is configured to assist inflow of air into the plurality of air ducts.

15 Claims, 14 Drawing Sheets

(52) U.S. Cl.
CPC ............. *H02K 9/19* (2013.01); *H02K 17/168* (2023.05); *H02K 17/18* (2013.01); *H02K 17/20* (2013.01)

(58) Field of Classification Search
CPC .... H02K 2213/03; H02K 5/203; H02K 5/207; H02K 7/04; H02K 9/06; H02K 9/10; H02K 9/19
See application file for complete search history.

(56) References Cited

U.S. PATENT DOCUMENTS

| | | |
|---|---|---|
| 10,312,766 B2 | 6/2019 | Pokorny |
| 10,476,332 B2 * | 11/2019 | Lang ...................... H02K 17/16 |
| 10,655,532 B2 * | 5/2020 | Jacob ....................... H02K 9/06 |
| 2002/0163276 A1 * | 11/2002 | Lawrence ............. H02K 15/021 29/609 |
| 2012/0194040 A1 * | 8/2012 | Hao ......................... H02K 3/28 310/68 D |
| 2015/0303749 A1 * | 10/2015 | Okubo ................... H02K 21/14 310/156.38 |
| 2018/0174098 A1 * | 6/2018 | Andres .................. H02K 5/203 |
| 2019/0006894 A1 * | 1/2019 | Kobayashi ............... H02K 7/14 |
| 2019/0273421 A1 * | 9/2019 | Velderman ........... H02K 11/215 |
| 2019/0386537 A1 | 12/2019 | Dib et al. |
| 2020/0336056 A1 * | 10/2020 | Chen ...................... H02K 15/023 |
| 2020/0350800 A1 * | 11/2020 | Hurry ...................... H02K 5/207 |
| 2020/0358337 A1 * | 11/2020 | Scothern ............. H02K 5/1732 |
| 2020/0412213 A1 * | 12/2020 | Katsuki .................. H02K 1/276 |
| 2021/0296956 A1 * | 9/2021 | Eilenberger .............. H02K 3/48 |

\* cited by examiner

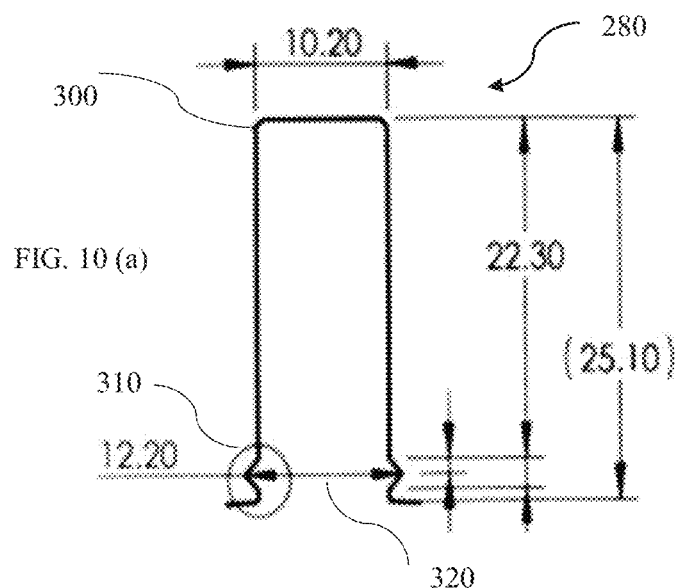
FIG. 10 (a)
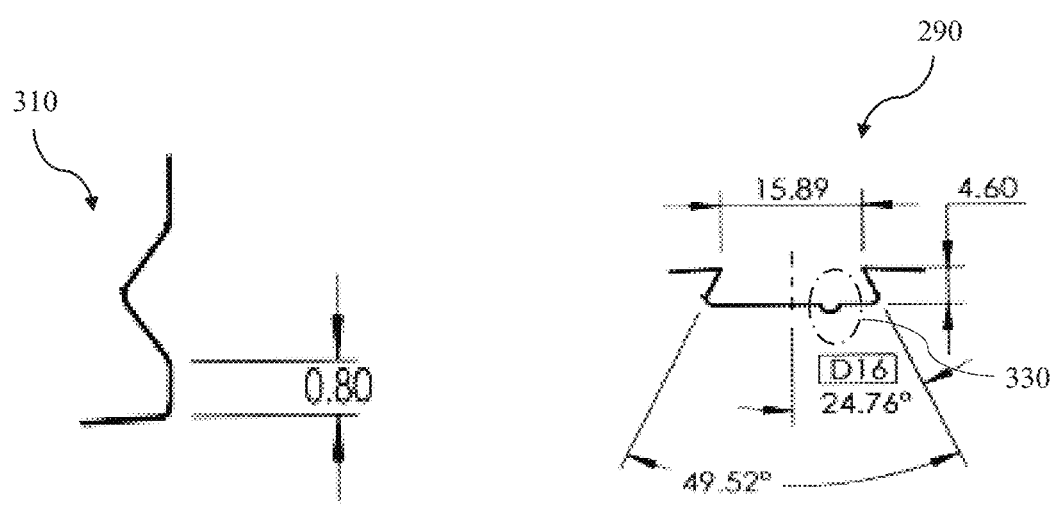
FIG. 10 (b)
FIG. 10 (c)

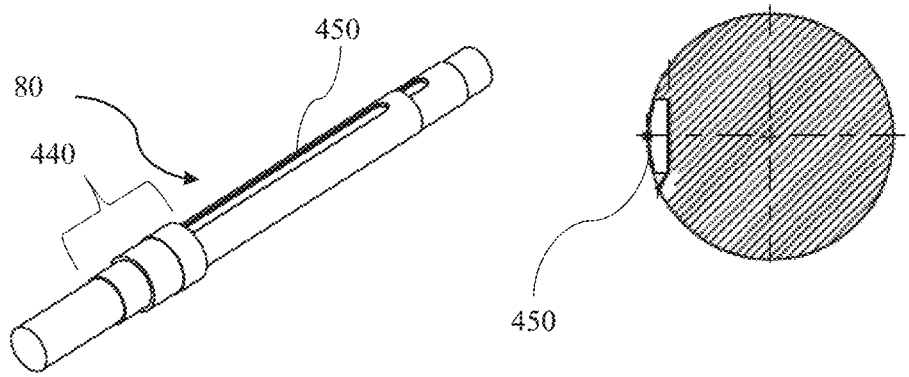
FIG. 14 (a)
FIG. 14 (b)
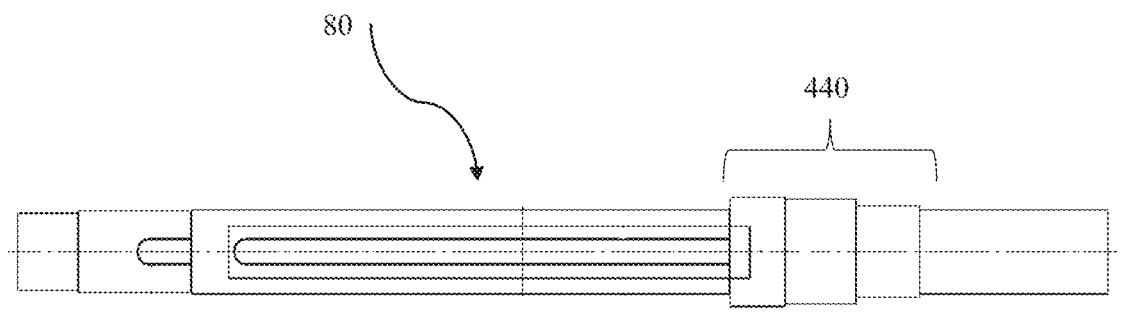
FIG. 14 (c)

INDUCTION MOTOR

EARLIEST PRIORITY DATE

This application claims priority from a complete patent application filed in India having Patent Application No. 202041056387, filed on Dec. 24, 2020, and titled "INDUCTION MOTOR" and PCT Application bearing number "PCT/IB2021/062297" filed on Dec. 24, 2021, and titled "INDUCTION MOTOR".

FIELD OF INVENTION

Embodiments of a present disclosure relates to an induction machine, and more particularly to an induction motor with specific designed motor casing to house the heat management system and the induction machine components.

BACKGROUND

For proper operation of any motor at high torque, all motor components should be compactly packed so that structural integrity is maintained during motor operation. An induction motor mainly comprises a stator which generates a revolving magnetic field inside a cavity and a rotor which is rotatably arranged inside the cavity of the stator.

The conventional designs lack structural adequacy for automotive requirements between the stator and rotor assembly. In conventionally designed induction motor, a stator comprises a stator stack defining the cavity and a stator winding which is wound on the inner peripheral portion of the stator stack. A magnetic field is generated inside the cavity, when current flow through the stator winding. Similarly, a rotor comprises a rotor stack and a rotor cage with a rotary shaft.

Inadequate coupling of rotor and stator introduces stress and deformation to the motor structure making the conventional designs unsuitable to bear the shock and vibrations during driving of electric vehicle. Further, most of the conventional induction motors available in market also need to have an efficient thermal management, if they were to be fitted in the electric vehicles.

Moreover, it is also desired to have a compact design of the induction motor suitable for space management and low cost of fabrication. However, the existing induction motors miss out on one or the other front.

The design needs to be reliable, efficient, rugged as well as the motor should be able to produce high torque per ampere.

Hence, there is a need for an improved induction motor to address the aforementioned issues.

BRIEF DESCRIPTION

In accordance with one embodiment of the disclosure, an induction motor is disclosed. The induction motor comprises a motor casing. The motor casing is fabricated in an irregular octagonal shape with a central open area. The motor casing is configured to house a cooling system within an outer wall and an inner wall of the motor casing. The cooling system comprises a plurality of interconnected cooling channels and a plurality of air ducts.

The induction motor comprises a stator assembly housed within the central open area of the motor casing. The stator assembly comprises a hollow cylindrical stator stack. The hollow cylindrical stator stack is fabricated with a plurality of rectangular shaped open slots on inner surface periphery and a plurality of cleating notches on outer surface periphery. The stator assembly also comprises a set of intertwined stator rods, and configured as stator windings and housed within the plurality of rectangular shaped open slots.

The induction motor comprises a rotor assembly. The rotor assembly is configured to be fitted inside the stator assembly. The rotor assembly comprises a hollow cylindrical rotor stack fabricated with a plurality of predesigned rotor slots on outer surface periphery, a plurality of vent holes and a rectangular notch of predefined dimension on inner surface periphery. The rotor assembly also comprises a set of rotor bars configured as rotor windings and housed within the plurality of predesigned rotor slots.

The induction motor also comprises a shaft configured to be fitted to the rotor assembly. The shaft comprises a rectangular depression for proper alignment with the notch on inner surface periphery of the rotor assembly. The induction motor also comprises a fan positioned on the first axial end of the induction motor. The fan is configured to assist inflow of air into the plurality of air ducts.

To further clarify the advantages and features of the present disclosure, a more particular description of the disclosure will follow by reference to specific embodiments thereof, which are illustrated in the appended figures. It is to be appreciated that these figures depict only typical embodiments of the disclosure and are therefore not to be considered limiting in scope. The disclosure will be described and explained with additional specificity and detail with the appended figures.

BRIEF DESCRIPTION OF THE DRAWINGS

The disclosure will be described and explained with additional specificity and detail with the accompanying figures in which:

FIG. 10 (a) is an exemplary representation of an embodiment representing a single rectangular shaped open slot corresponding to the hollow cylindrical stator stack in accordance with the present disclosure:

FIG. 10 (b) is an exemplary representation of an embodiment representing a v-shaped depression corresponding to the single rectangular shaped open slot in accordance with the present disclosure;

FIG. 10 (c) is an exemplary representation of an embodiment representing a single cleating notch with c-shaped depression in accordance with the present disclosure;

FIG. 13 (b) is an exemplary representation of an embodiment representing upper circular portion of the single predesigned rotor slot corresponding to the hollow cylindrical rotor stack in accordance with the present disclosure;

FIG. 13 (c) is an exemplary representation of an embodiment representing a notch with a c-shaped depression fabricated with the hollow cylindrical rotor stack in accordance with the present disclosure:

FIG. 14 (a) is an exemplary representation of an embodiment representing the shaft in accordance with the present disclosure;

FIG. 14 (b) is horizontal cross section of the shaft depicting the depression corresponding to the shaft in accordance with the present disclosure; and FIG. 14 (c) illustrates exemplary representation of the shaft with one or more equi-spaced steps in accordance with an exemplary embodiment of the present disclosure.

Figure 1:
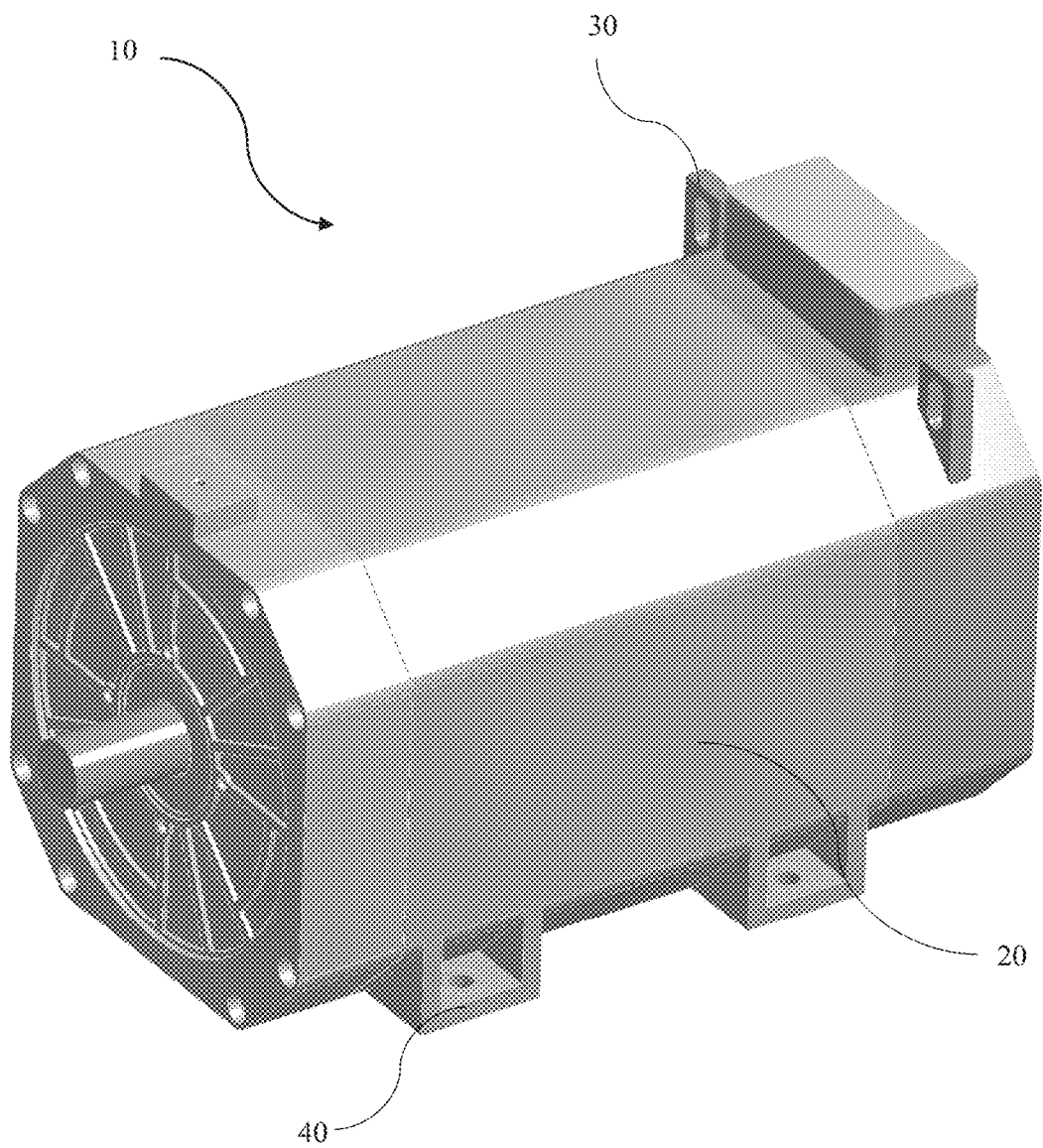
FIG. 1 is a schematic representation of an induction motor in accordance with an embodiment of the present disclosure.

Further, those skilled in the art will appreciate that elements in the figures are illustrated for simplicity and may not have necessarily been drawn to scale. Furthermore, in terms of the construction of the device, one or more components of the device may have been represented in the figures by conventional symbols, and the figures may show only those specific details that are pertinent to understanding the embodiments of the present disclosure so as not to obscure the figures with details that will be readily apparent to those skilled in the art having the benefit of the description herein.

DETAILED DESCRIPTION

For the purpose of promoting an understanding of the principles of the disclosure, reference will now be made to the embodiment illustrated in the figures and specific language will be used to describe them. It will nevertheless be understood that no limitation of the scope of the disclosure is thereby intended. Such alterations and further modifications in the illustrated online platform, and such further applications of the principles of the disclosure as would normally occur to those skilled in the art are to be construed as being within the scope of the present disclosure.

The terms "comprises", "comprising", or any other variations thereof, are intended to cover a non-exclusive inclusion, such that a process or method that comprises a list of steps does not include only those steps but may include other steps not expressly listed or inherent to such a process or method. Similarly, one or more devices or subsystems or elements or structures or components preceded by "comprises . . . a" does not, without more constraints, preclude the existence of other devices, subsystems, elements, structures, components, additional devices, additional subsystems, additional elements, additional structures or additional components. Appearances of the phrase "in an embodiment", "in another embodiment" and similar language throughout this specification may, but not necessarily do, all refer to the same embodiment.

Unless otherwise defined, all technical and scientific terms used herein have the same meaning as commonly understood by those skilled in the art to which this disclosure belongs. The system, methods, and examples provided herein are only illustrative and not intended to be limiting.

In the following specification and the claims, reference will be made to a number of terms, which shall be defined to have the following meanings. The singular forms "a", "an", and "the" include plural references unless the context clearly dictates otherwise.

Embodiments of the present disclosure relates to an induction motor. The induction motor comprises a motor casing. The motor casing is fabricated in an irregular octagonal shape with a central open area. The motor casing is configured to house a cooling system within an outer wall and an inner wall of the motor casing. The cooling system comprises a plurality of interconnected cooling channels and a plurality of air ducts.

The induction motor comprises a stator assembly housed within the central open area of the motor casing, a rotor assembly fitted inside the stator assembly and a shaft configured to be fitted to the rotor assembly. The stator assembly comprises a hollow cylindrical stator stack and a set of intertwined stator rods. The rotor assembly comprises a hollow cylindrical rotor stack fabricated with a plurality of predesigned rotor slots on outer surface periphery, a plurality of vent holes and a rectangular notch of predefined dimension on inner surface periphery. The rotor assembly also comprises a set of rotor bars configured as rotor windings and housed within the plurality of predesigned rotor slots. The induction motor also comprises a fan positioned on the first axial end of the induction motor and configured to assist inflow of air into the plurality of air ducts.

FIG. 1 is a schematic representation of an induction motor 10 in accordance with an embodiment of the present disclosure. The induction motor 10 works on the principle of electromagnetic induction. In induction motor 10 operation, electric current in the rotor needed to produce torque is obtained via electromagnetic induction from the rotating magnetic field of the stator winding. Any induction motor 10 is installed at specified location with the help of a plurality of mounting holes 40 and flange 30. In such embodiment, the plurality of mounting holes 40 and the flange 30 are mechanically coupled with outer wall of motor casing 20.

During the operation of the induction motor 10, the induction motor 10 encounters losses such as iron losses, stator copper losses, friction losses, windage losses and rotor solid losses. Such losses affect the efficiency and performance of the induction motor 10. Specifically, designed structure will automatically help the induction motor 10 to reduce all such losses. Moreover, such specific design will also control stress and strain corresponding to induction motor 10 components.

Figure 2:
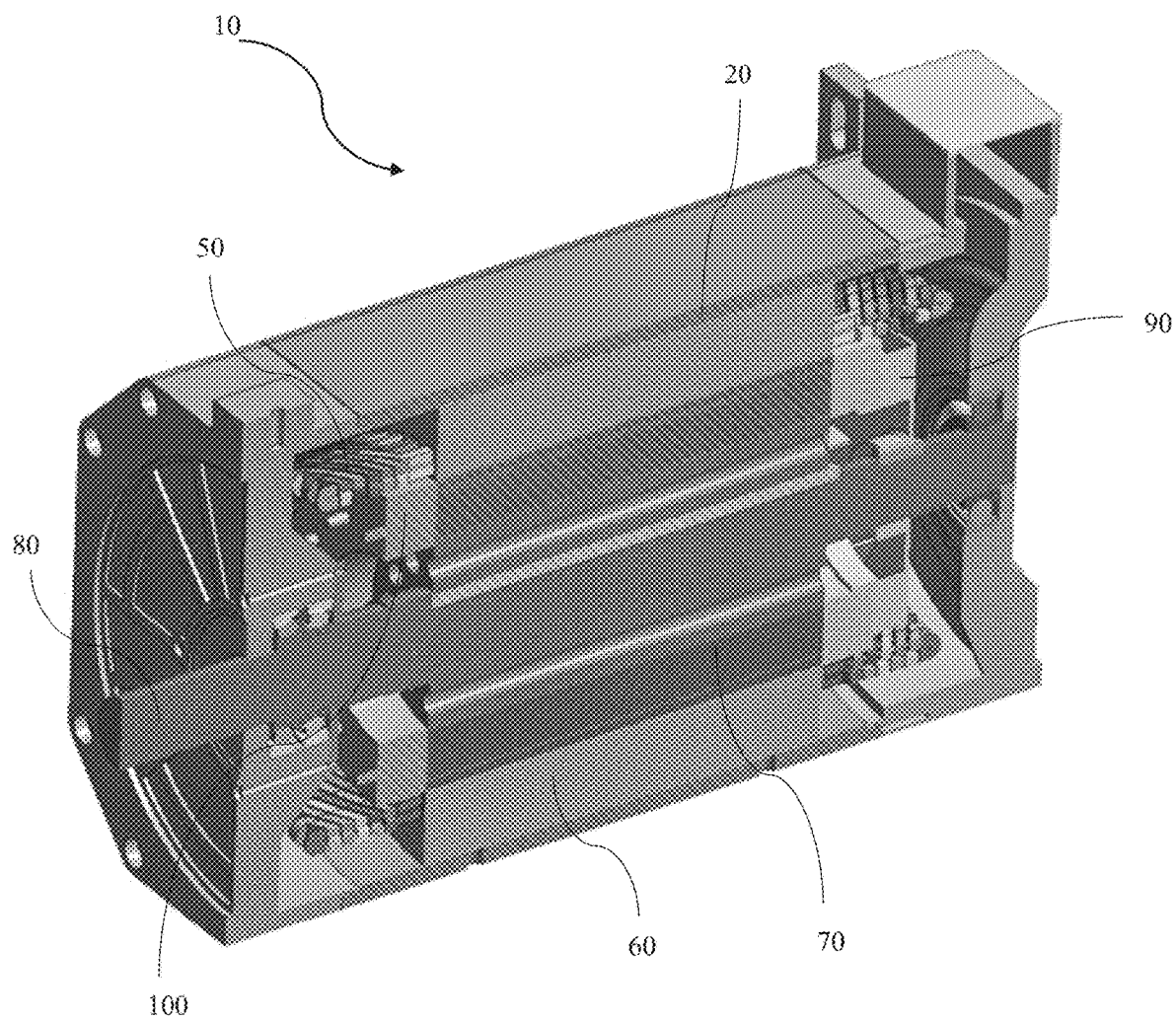
FIG. 2 is a vertical cross section representation of an induction motor with the induction motor components in accordance with an embodiment of the present disclosure.

FIG. 2 is a vertical cross section representation of an induction motor 10 with the induction motor components in accordance with an embodiment of the present disclosure. The induction motor 10 comprises a motor casing 20. The motor casing 20 is fabricated in an irregular or non-uniform octagonal shape with a central open area. It is pertinent to note that the central open area is a hollow area fabricated to house induction motor 10 components. The induction motor 10 components include a stator assembly 60, a rotor assembly 70, a shaft 80 and a fan 90. FIG. 2 specifically illustrates the placement of the stator assembly coils 50 along with end bells 100, as the end bells 100 provide a smooth, safe entrance for the stator assembly coils 50.

Figure 3:
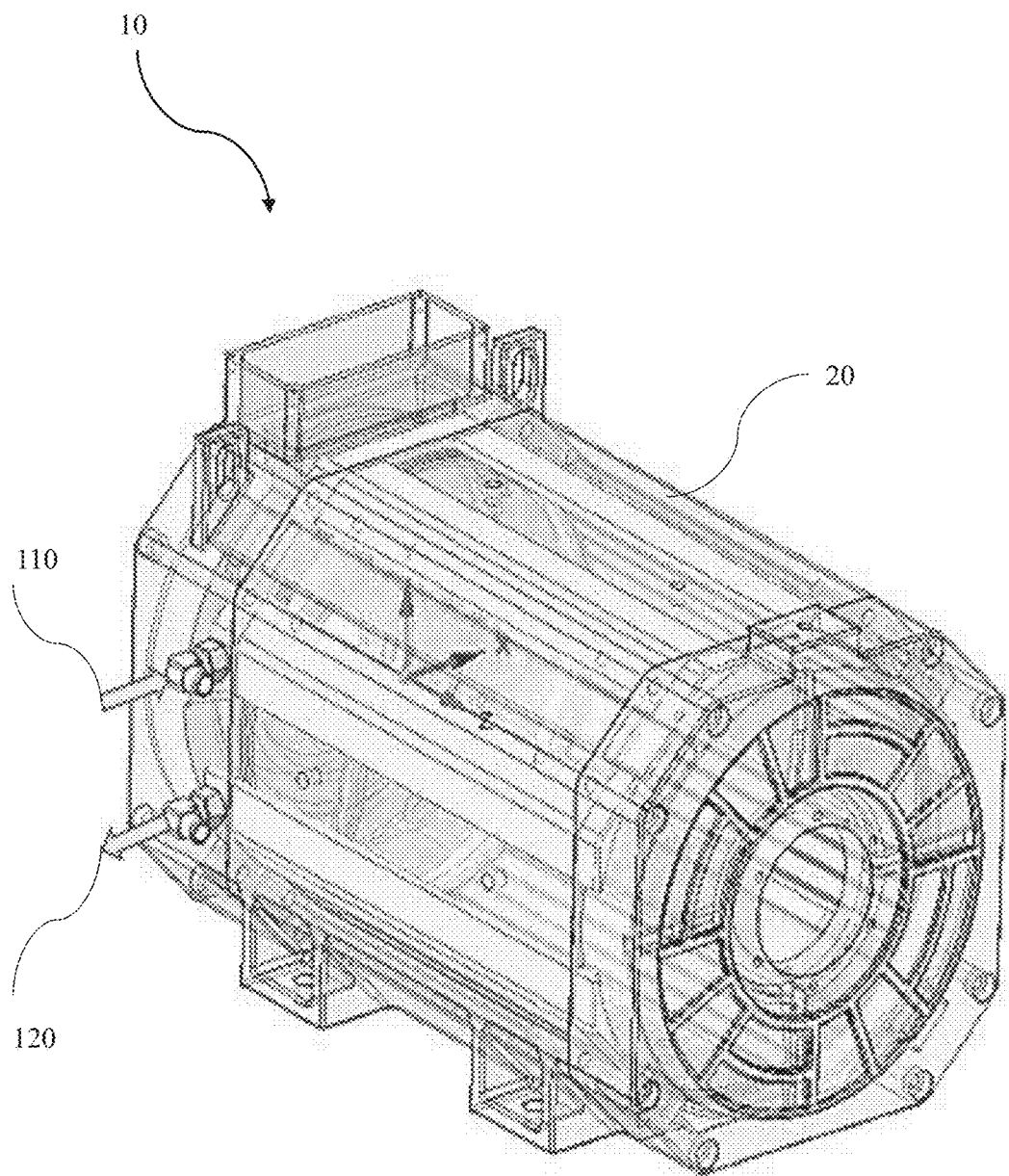
FIG. 3 is a schematic sectional representation of a cooling system of the induction motor in accordance with an embodiment of the present disclosure.
Figure 4:
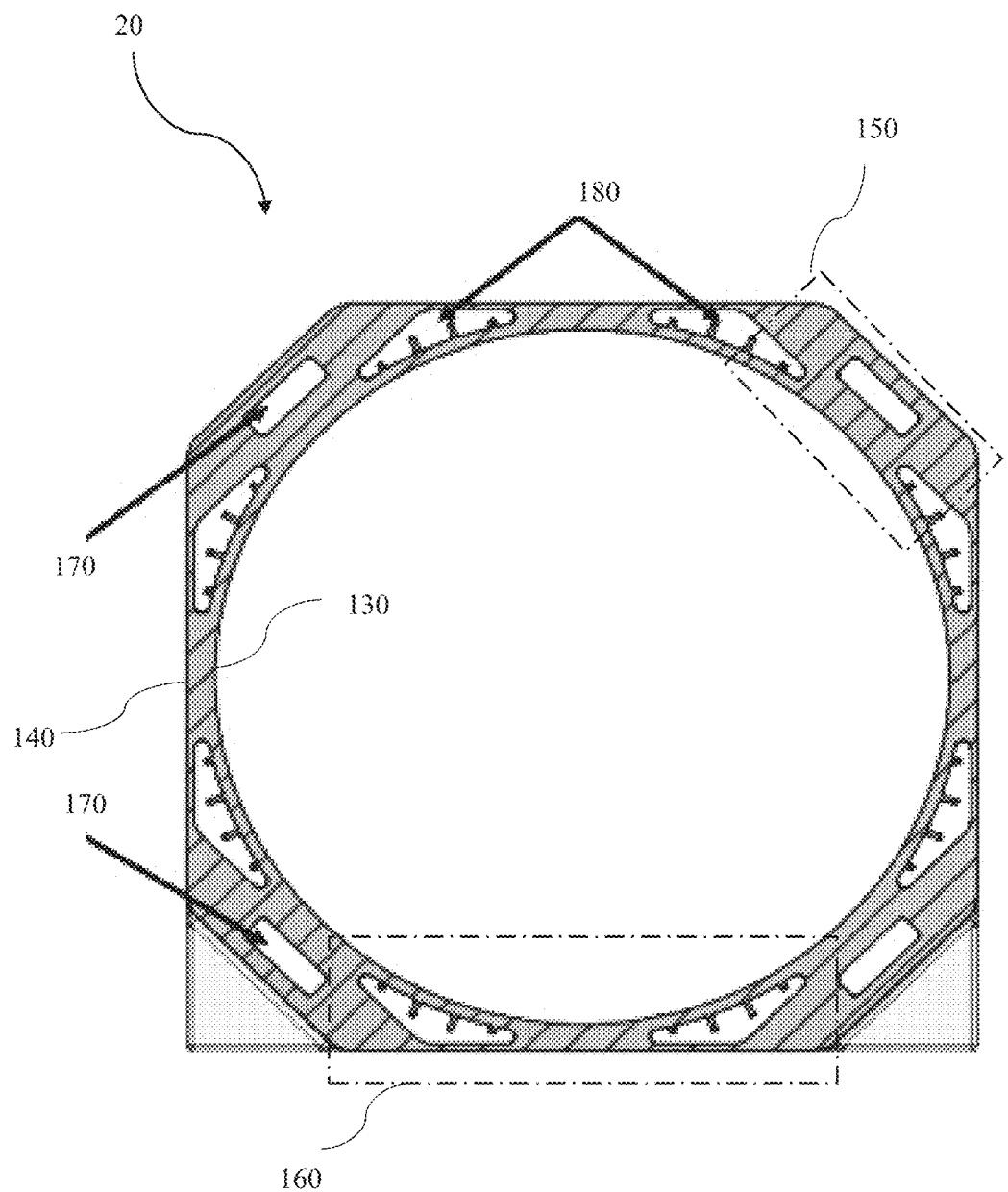
FIG. 4 is a horizontal cross section representation of a plurality of interconnected cooling channels and a plurality of air ducts fabricated between inner wall and outer wall of the motor casing of FIG. 3 in accordance with an embodiment of the present disclosure.

FIG. 3 is a schematic sectional representation of a cooling system of the induction motor 10 in accordance with an embodiment of the present disclosure. The motor casing 20 is configured to house a cooling system within an outer wall 140 and an inner wall 130 of the motor casing 20 (as shown in FIG. 4). The cooling system comprises a plurality of interconnected cooling channels 180 and a plurality of air ducts 170 (as shown in FIG. 4). The irregular octagonal shaped motor casing 20 comprises a set of four side walls 160 and a set of four corner walls 150 (as shown in FIG. 4). The set of four side walls 160 is fabricated to be elongated and thin, as compared to the set of four corner walls 150, whereas the set of four corner walls 150 is fabricated to be short and wide, as compared to the set of four side walls 160, thus providing the irregular octagonal shaped motor casing 20. Furthermore, the motor casing 20 is characterized on the outer wall 140 by a coolant liquid inlet valve 110 and a coolant liquid outlet valve 120.

FIG. 4 is a horizontal cross section representation of a plurality of interconnected cooling channels and a plurality of air ducts fabricated between inner wall 130 and outer wall 140 of the motor casing 20 of FIG. 3 in accordance with an embodiment of the present disclosure. The set of four side walls 160 is fabricated in elongated and thin fashion to house the plurality of interconnected cooling channels 180 interposed axially. The set of four corner walls 150 is fabricated in short and wider fashion to house the plurality of air ducts 170 interposed axially.

Figure 5:
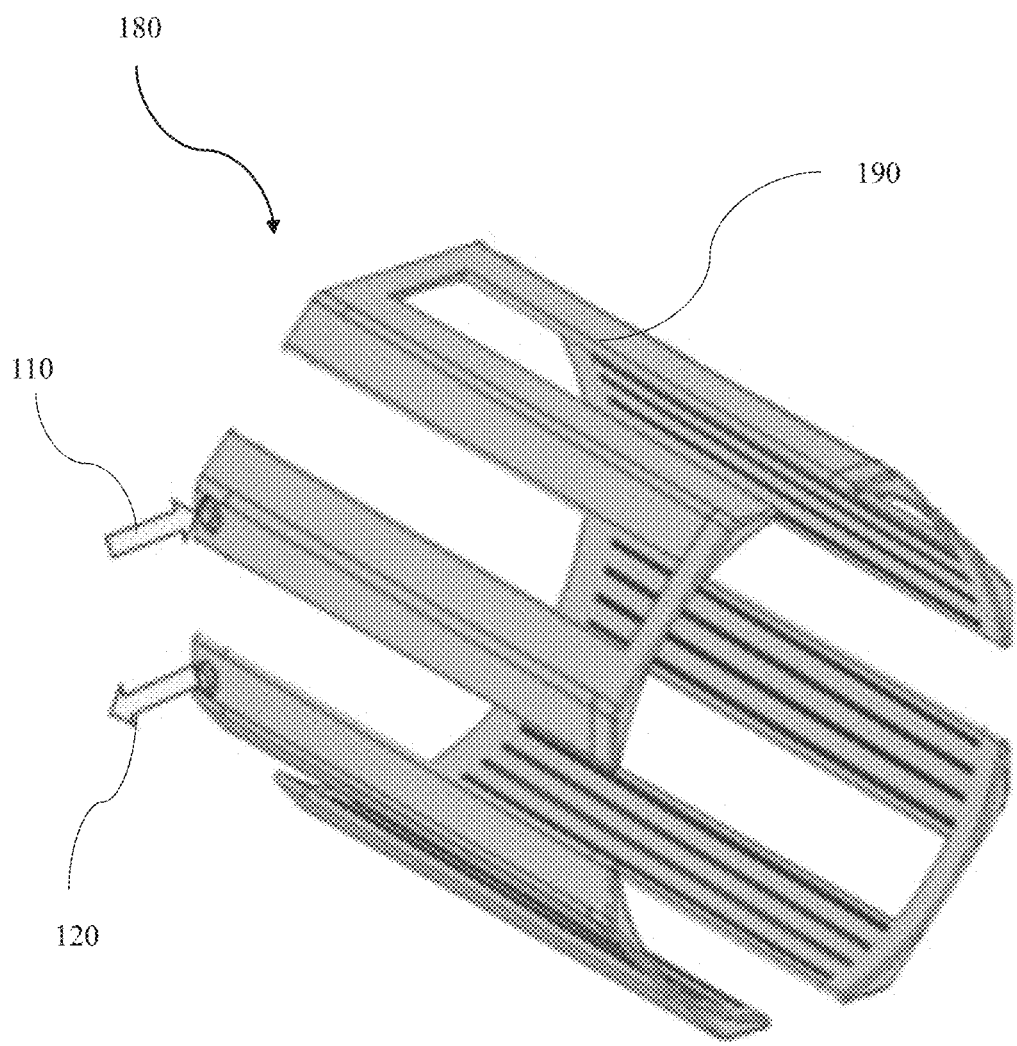
FIG. 5 is a schematic representation of plurality of interconnected cooling channels of FIG. 4 in accordance with an embodiment of the present disclosure.

FIG. 5 is a schematic representation of plurality of interconnected cooling channels 180 of FIG. 4 in accordance with an embodiment of the present disclosure. The plurality of interconnected cooling channels 180 is fabricated in a pre-designed meandering fashion to envelop the motor casing 20 and enable flow of coolant liquid to dissipate heat produced by the stator coil. In one embodiment, the coolant liquid comprises water and glycol in a ratio of 1:1. Glycol is basically used to maintain temperature consistency.

In such embodiment, the pre-designed meandering fashion fabrication of the plurality of interconnected cooling channels 180 comprises helical loop fashion fabrication 190 of the plurality of interconnected cooling channels 180 enveloping the motor casing 20. The plurality of interconnected cooling channels 180 is characterized on the outer wall by a coolant liquid inlet valve 110 and a coolant liquid outlet valve 120. A coolant liquid inlet valve 110 is configured to allow inlet of the coolant liquid and a coolant liquid outlet valve 120 is configured to enable discharge of the coolant liquid.

The plurality of interconnected cooling channels 180 is designed in a pre-defined shape with one or more vertical protrusions on base side. In one particular embodiment, the protrusions are configured to evenly spread the coolant liquid inside the plurality of interconnected cooling channels. In another particular embodiment, the protrusion on the base side increases the contact surface area for cooling purpose, thereby cooling the stator coil at a fast rate. It is pertinent to note that the height of each of the one or more vertical protrusions increases with distance from the base side corners. In one embodiment, the one or more vertical protrusions may be fabricated in a rectangular shape structure.

Figure 6:
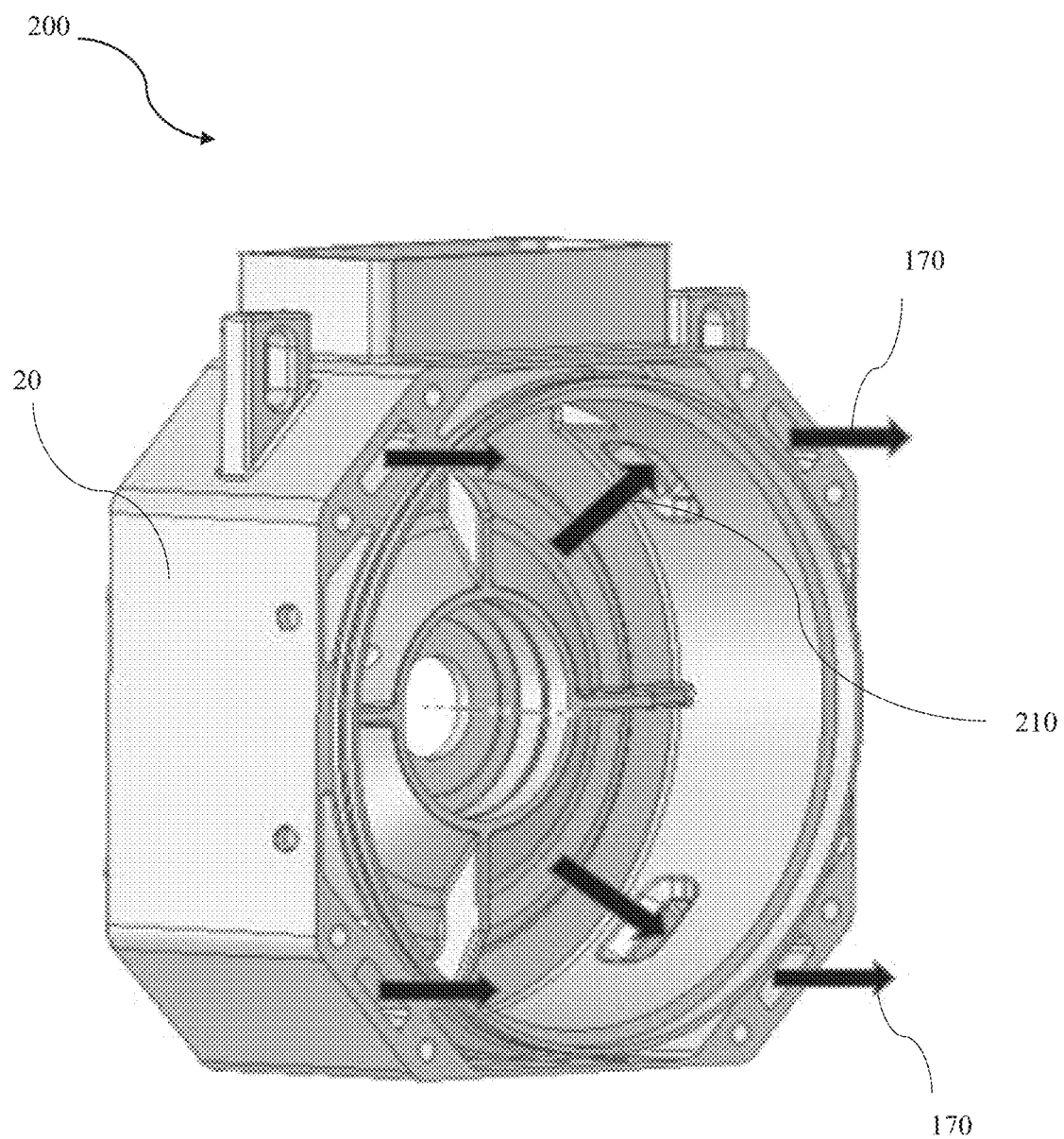
FIG. 6 is a left side horizontal cross section representation of plurality of air ducts along with a set of inflow air openings of FIG. 4 in accordance with an embodiment of the present disclosure.
Figure 7:
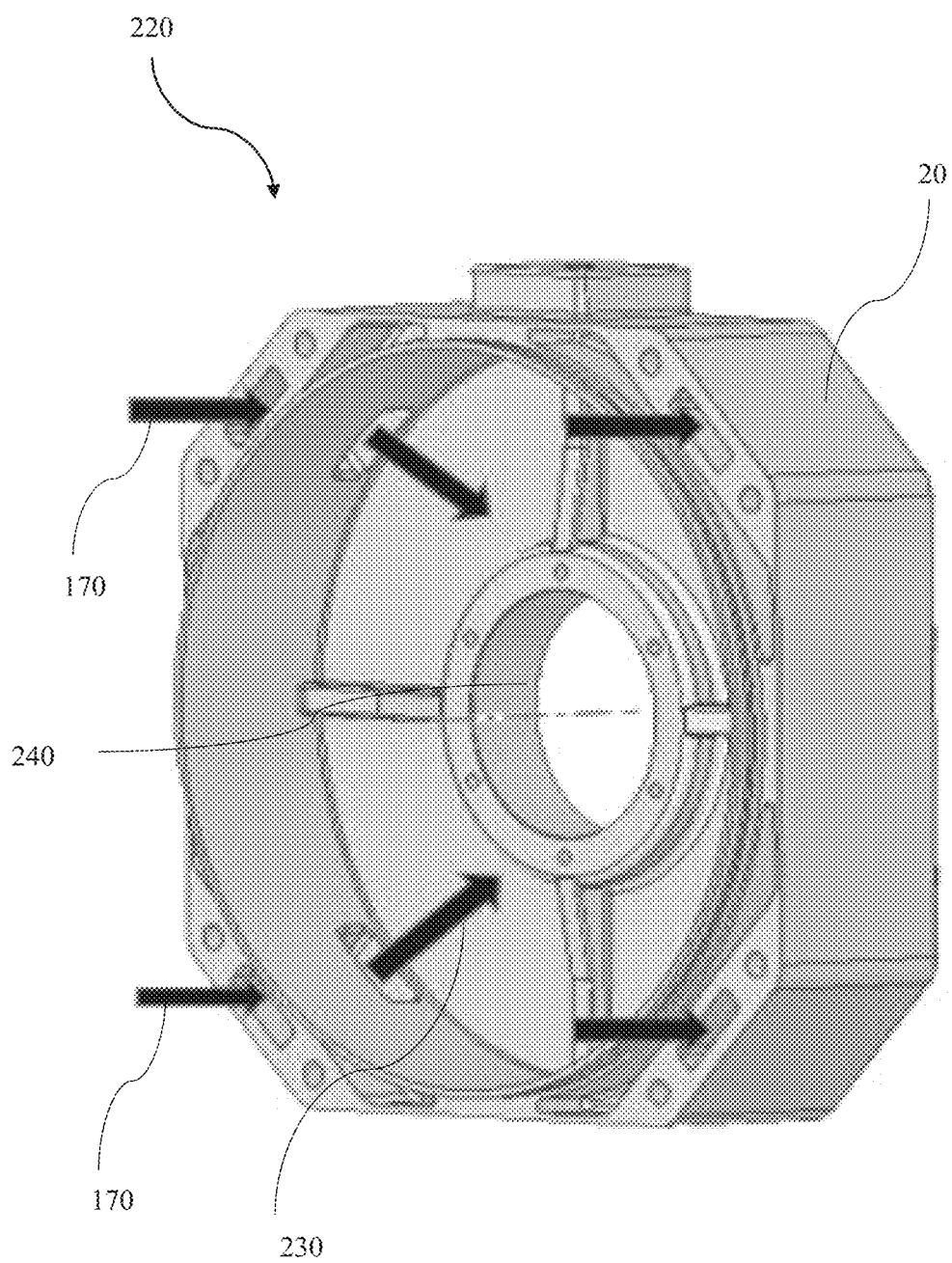
FIG. 7 is a right side horizontal cross section representation of plurality of air ducts along with a set of outflow air openings of FIG. 4 in accordance with an embodiment of the present disclosure.

FIG. 6 is a left side horizontal cross section representation of plurality of air ducts 200 along with a set of inflow air openings of FIG. 4 in accordance with an embodiment of the present disclosure. FIG. 7 is a right side horizontal cross section representation of plurality of air ducts 220 along with a set of outflow air openings of FIG. 4 in accordance with an embodiment of the present disclosure.

Each of the plurality of air ducts 170 is configured to envelop the motor casing 20 and further cool the stator coil temperature and the rotor temperature by inflow and outflow of air. The plurality of air ducts 170 is fabricated by a set of inflow air openings 210 on the inner wall 130 of the motor casing 20 first axial end and a set of outflow air openings 230 on the inner wall 130 of the motor casing 20 second axial end for inflow and outflow of air. The air exit from the set of outflow air openings 230 is circulated back into the plurality of air ducts 170 to the set of inflow air openings 210 via the plurality of vent holes 390.

In such embodiment, the rotor 70 is fabricated with a plurality of vent holes of predefined dimensions. A specially designed fan (not shown in FIG. 7), coupled at the end of rotor stack, is configured to suck the hot cool air passing from the rotor vents and push it inside the plurality of air ducts 170 present in the motor casing 20 for heat dissipation.

The irregular or non-uniform octagonal shape of the motor casing 20 imparts following characteristics:
(a) The set of four side walls 160 is fabricated to be elongated and thin, as compared to the set of four corner walls 150, thus an efficient design to house the plurality of interconnected cooling channels 180 which are interposed axially. Therefore, the side walls 160 are designed thinner in width since it has to house only the plurality of interconnected cooling channels 180, and
(b) The set of four corner walls 150 is fabricated to be short and wide, as compared to the set of four side walls 160, thus an efficient design to house the plurality of air ducts 170 which are interposed axially. Therefore, only corner walls of the casing are made thicker in width so that it can accommodate both the plurality of air ducts 170 as well as plurality of interconnected cooling channels 180.

As a result of aforementioned characteristics, a lot less material is required during fabrication of the casing, without compromising structural and spatial integrity, as compared to the existing designs where the sides of the casing are uniform. This further reduces the weight and cost of fabrication of the induction motor.

Figure 8:
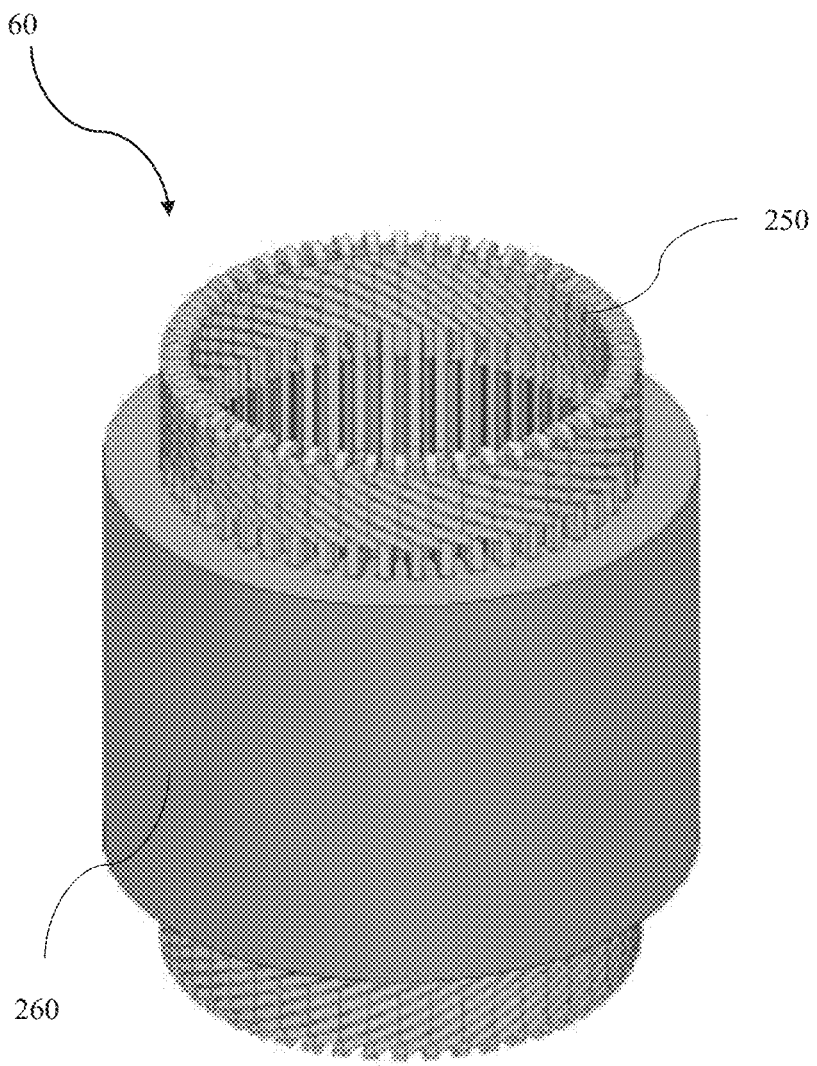
FIG. 8 is a schematic representation of an embodiment representing stator assembly of the induction motor of FIG. 2 in accordance with the present disclosure.

FIG. 8 is a schematic representation of an embodiment representing stator assembly 60 of the induction motor of FIG. 2 in accordance with the present disclosure. The induction motor 10 also includes a stator assembly 60 for motor operation. The stator assembly 60 is characterized by a hollow cylindrical stator stack 260 and a set of intertwined stator rods 250. It is pertinent to note that the dimension of the hollow cylindrical stator stack 260 and the set of intertwined stator rods 250 depends on the output requirement from the induction motor 10.

Figure 9:
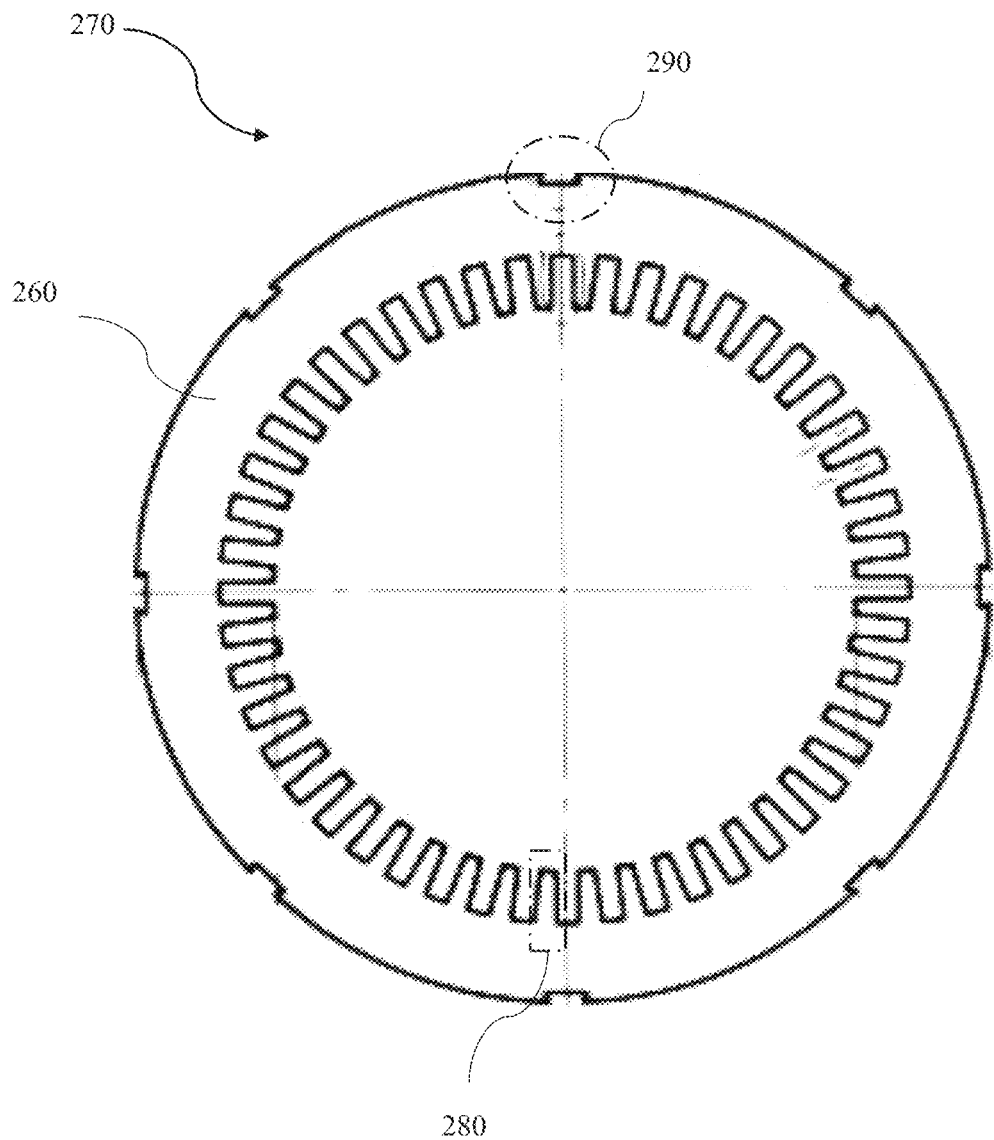
FIG. 9 is an exemplary representation of an embodiment representing horizontal cross section view of the hollow cylindrical stator stack of the stator assembly of FIG. 8 in accordance with the present disclosure.

FIG. 9 is an exemplary representation of an embodiment representing horizontal cross section view of the hollow cylindrical stator stack 270 of the stator assembly of FIG. 8 in accordance with the present disclosure. The hollow cylindrical stator stack 260 is fabricated with a plurality of rectangular shaped open slots 280 on inner surface periphery and a plurality of cleating notches 290 on outer surface periphery. In such embodiment, the rectangular dimensions of the slots 280 are in accordance with the dimension of the hollow cylindrical stator stack 260. In such embodiment, dimensions of each of the plurality of cleating notches 290 is also in accordance with the dimension of the hollow cylindrical stator stack 260.

It is pertinent to note that the plurality of rectangular shaped open slots 280 is equispaced and distributed around the hollow cylindrical stator stack 260. In such embodiment, two adjacent sides of each of the plurality of rectangular shaped open slots 280 is being fabricated with corresponding two v-shaped depressions of pre-defined dimensions.

Furthermore, each of the plurality of cleating notches 290 are equispaced and distributed around the hollow cylindrical stator stack 260. In such embodiment, each of plurality of cleating notches 290 is fabricated with a c-shaped depression of pre-defined dimensions on the outer surface. The c-shaped depression is configured to align enveloping motor casing 20 with the stator assembly 60.

Such exemplary embodiment clearly showcases the equal distribution of rectangular open slots 280 and the distribution of cleating notches 290 over the stator assembly 60 of a 120 kW EV motor. The outer periphery diameter of the showcased hollow cylindrical stator stack 260 is of 390 mm. The inner periphery diameter of the showcased hollow cylindrical stator stack 260 is of 265 mm. In the stated exemplary embodiment, the hollow cylindrical stator stack 260 has about 48 rectangular open slots 280 and 8 cleating notches 290.

The set of intertwined stator rods 250 (as shown in FIG. 8) is configured as stator windings and housed within the plurality of rectangular shaped open slots 280. Each rod of the set of intertwined stator rods 250 is being aligned along the two v-shaped depressions of each of plurality of rectangular shaped open slots 280. The intertwining of stator rods 250 with v-shaped depressions provide tight fitting of the stator components.

FIG. 10 (a) is an exemplary representation of an embodiment representing a single rectangular shaped open slot 280 corresponding to the hollow cylindrical stator stack 260 in accordance with the present disclosure. The exemplary representation portrays a single rectangular open slot 280. Here, in the single rectangular slot 300, each two adjacent sides have a v-shaped depression 310. Such depression 310 enables tight fitting of the rods as they are placed in the stator core. Two adjacent slots 280 are in a gap of 7.5°. As shown, the length of each rectangular slot 300 is of 25.10 mm and the breadth is of 10.20 mm. The stator rods 250 are positioned in between the showcased gap 320. The dimension of the length from the v-shaped depression 310 to the close rectangular slot 300 end is of 22.30 mm.

FIG. 10 (b) is an exemplary representation of an embodiment representing a v-shaped depression 310 corresponding to the single rectangular shaped open slot 300 in accordance with the present disclosure. Each v-shaped depression 310 is located near to the open end and the depression length is of 2.80 mm. Distance between the last end of the v-shaped depression 310 to the open rectangular slot end 300 is 0.80 mm. Here, distance between tip of the two adjacent v-shaped depression 310 in the rectangular open slot 300 is of 12.20 mm.

FIG. 10 (c) is an exemplary representation of an embodiment representing a single cleating notch 290 with c-shaped depression in accordance with the present disclosure. It is pertinent to note that each cleating notch 290 is apart at an angle of 45° around the outer surface periphery. The spread of the showcased single cleating notch 290 is of 49.52°.

Here, the showcased c-shaped depression 330 of a single cleating notch 290 enables tight fitting of the stator frame to the stator assembly 260. Length and breadth of the single cleating notch 290 is of 15.89 mm and 4.60 mm respectively.

Figure 11:
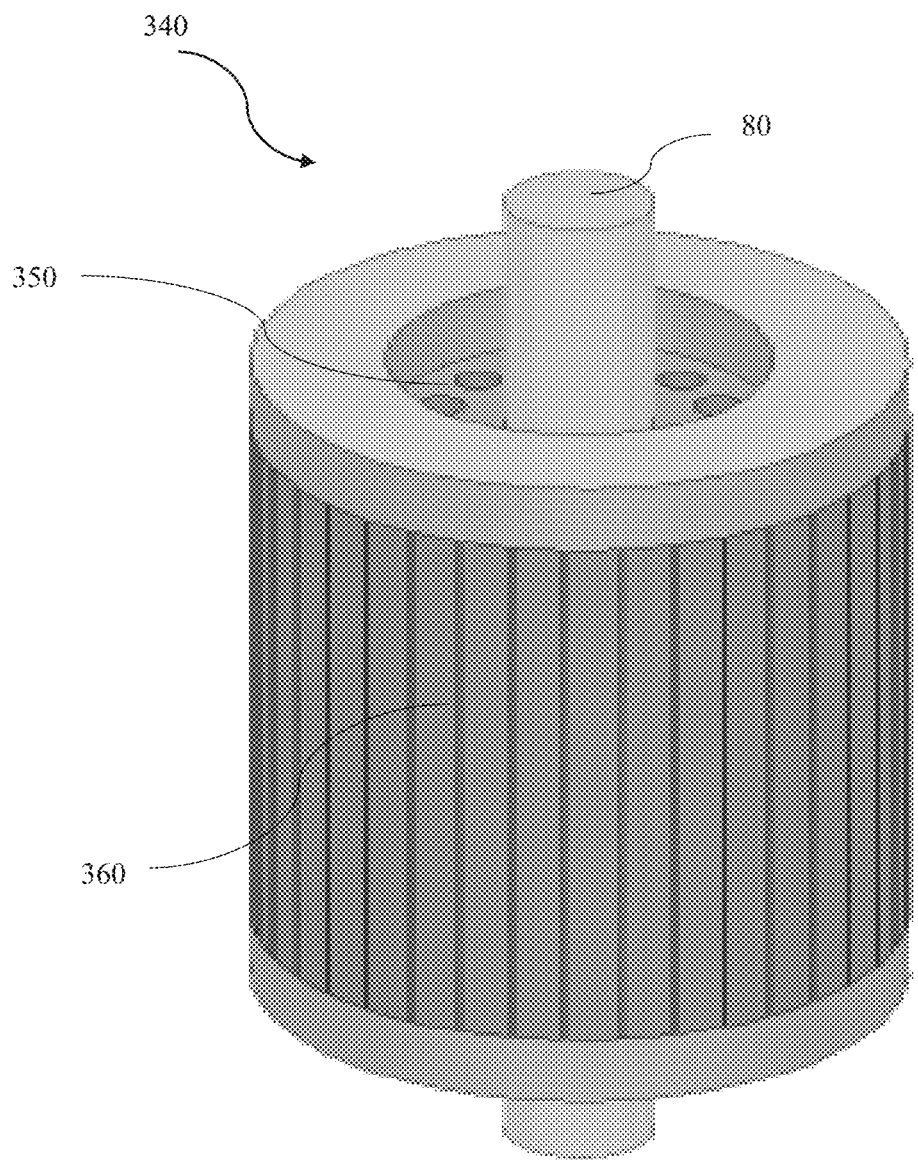
FIG. 11 is a schematic representation of an embodiment representing rotor assembly of the induction motor of FIG. 2 in accordance with the present disclosure.

FIG. 11 is a schematic representation of an embodiment representing rotor assembly 70 of the induction motor of FIG. 2 in accordance with the present disclosure. A rotor assembly 70 housed within the stator assembly 60. The rotor assembly 70 is configured to mount over shaft 80 of the induction motor 10. The rotor assembly 70 is characterized by a hollow cylindrical rotor stack 350 and a set of rotor bars 360. In such embodiment, the set of rotor bars 360 are interlocked with two rings to fit on both sides of the rotor assembly 70.

Figure 12:
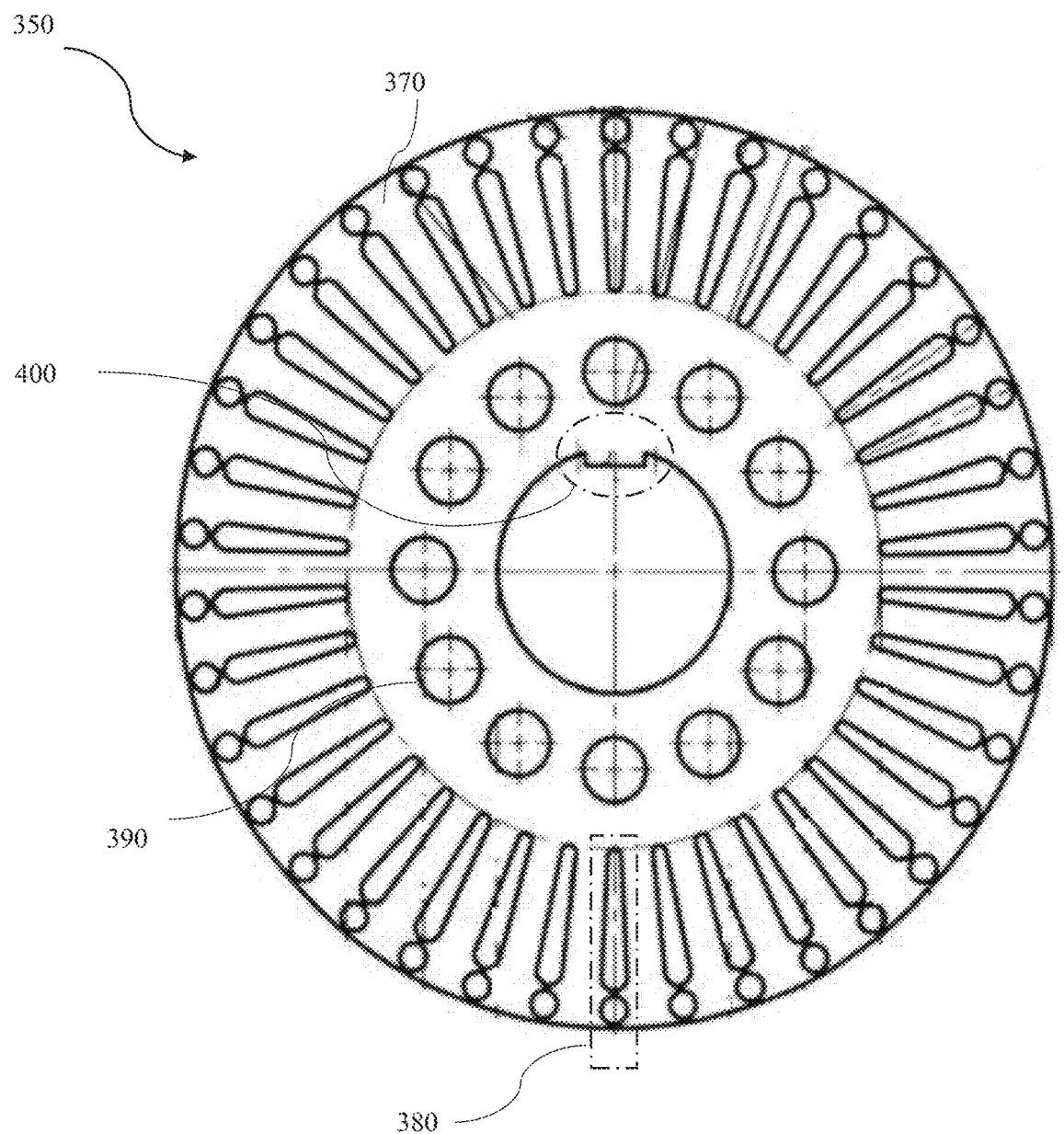
FIG. 12 is horizontal cross section view of the hollow cylindrical rotor stack of the rotor assembly of FIG. 11 in accordance with an exemplary embodiment of the present disclosure.

FIG. 12 is horizontal cross section view of the hollow cylindrical rotor stack 350 of the rotor assembly of FIG. 11 in accordance with an exemplary embodiment of the present disclosure. The hollow cylindrical rotor stack 350 is fabricated with a plurality of predesigned rotor slots 380 on outer surface periphery, a plurality of vent holes 390 and a notch 400 of predefined dimension on inner surface periphery.

In such embodiment, each of the plurality of predesigned rotor slots 380 are equispaced and distributed around the hollow cylindrical rotor stack 350. The notch 400 is fabricated with a c-shaped depression of predefined dimensions. The notch 400 is configured to align with the shaft of the induction motor corresponding to the rotor assembly 70. In one specific embodiment, the shaft 80 of the induction motor 10 is fabricated with a c-shaped protrusion for proper alignment with the notch 80 on inner surface periphery of the rotor assembly 70.

Each of the plurality of vent holes 390 of pre-defined diameter are equispaced and distributed around the hollow cylindrical rotor stack 350. In such embodiment, the plurality of vent holes 390 is configured to provide air ventilation pathways for cooling of rotor assembly 70.

Such exemplary embodiment clearly showcases the equal distribution of pre-designed rotor slots 380, the distribution of vent holes 390 and pre-positioned notch 400 of a 120 kW EV motor. The outer periphery diameter of the showcased the hollow cylindrical rotor stack 350 is 265 mm. The inner periphery diameter of the showcased the hollow cylindrical rotor stack 350 is 70.50 mm. The hollow cylindrical rotor stack 350 has about 38 rotor slots 380 and 12 vent holes 390. Here, the vent holes 390 are present on the inner side of the rotor assembly 70 to provide air ventilation pathways for cooling.

Figure 13:
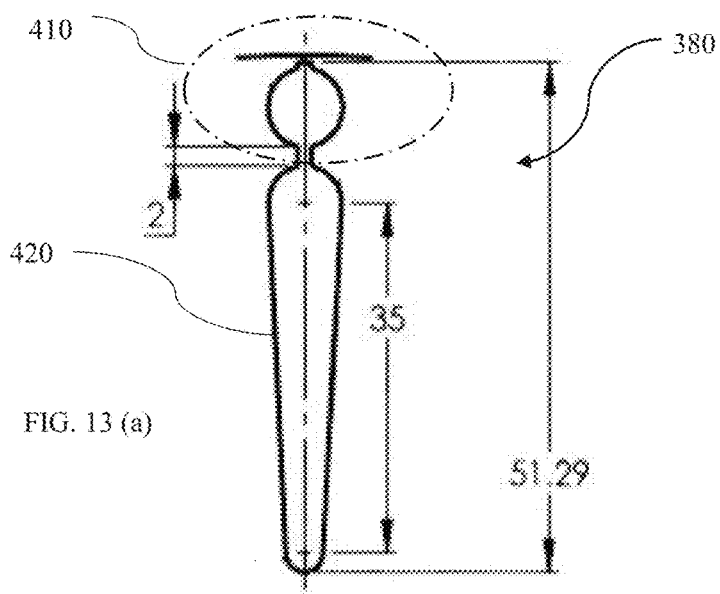
FIG. 13 (a) is an exemplary representation of an embodiment representing a single predesigned rotor slot corresponding to the hollow cylindrical rotor stack in accordance with the present disclosure.
Figure 13:
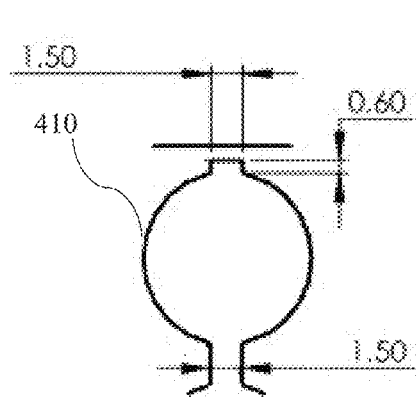
Figure 13:
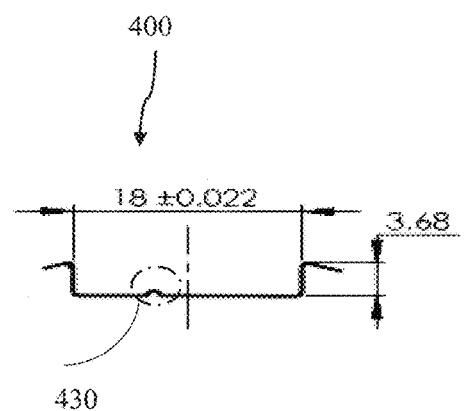

FIG. 13 (a) is an exemplary representation of an embodiment representing a single predesigned rotor slot 380 corresponding to the hollow cylindrical rotor stack 350 in accordance with the present disclosure. The exemplary representation portrays the pre-designed slots 380. Two adjacent slots 380 are in a gap of 9.47°. As shown, the length of each slot 380 is of 51.29 mm. Every slot 380 is a combination of two portions, upper circular portion 410 and lower triangular portion 420. The lower triangular portion 420 is of 35 mm length. Narrow stretch between the upper circular portion 410 and lower triangular portion 420 is of 2 mm. Fabricated narrow stretch is of 1.50 mm length.

FIG. 13 (b) is an exemplary representation of an embodiment representing upper circular portion 410 of the single predesigned rotor slot 380 corresponding to the hollow cylindrical rotor stack 350 in accordance with the present disclosure. The upper circular portion 410 of each of the slots 380 comprises an outward protrusion for proper fitting. The outward protrusion is of 0.60 mm breadth.

FIG. 13 (c) is an exemplary representation of an embodiment representing a notch 400 with a c-shaped depression 430 fabricated with the hollow cylindrical rotor stack 350 in accordance with the present disclosure. It is pertinent to note that notch 400 length is of 18 mm and breadth is of 3.68 mm. Here, the showcased depression 430 of the notch enables tight fitting of the shaft during operation. In one specific embodiment, depression 430 may be fabricated in c-shaped structure.

FIG. 14 (a) is an exemplary representation of an embodiment representing the shaft 80 in accordance with the present disclosure. The shaft 80 of pre-defined diameter is fabricated with a lengthwise depression 450 for proper alignment with the notch on inner surface periphery of the rotor assembly 70. The shaft 140 is also characterized by one or more equi-spaced steps 440 on both axial ends.

FIG. 14 (b) is horizontal cross section of the shaft 80 depicting the depression 450 corresponding to the shaft in accordance with the present disclosure. The lengthwise depression 450 is fabricated to have length of 18 mm and breadth of 5.5 mm. In one specific embodiment, the lengthwise depression 450 is fabricated with a c-shaped protrusion for proper alignment with the rotor notch's c-shaped depression on inner surface periphery of the rotor assembly 70.

FIG. 14 (c) illustrates exemplary representation of the shaft 80 with one or more equi-spaced steps 440 in accordance with an exemplary embodiment of the present disclosure. The shaft 80 is characterized by one or more equi-spaced steps 440 on both axial ends for aligning mounted induction motor 10 components. In such embodiment, the diameter of each of the one or more steps 440 increases with decrease in distance from both axial end of the induction motor 10.

The induction motor 10 further comprises a fan positioned on the first axial end of the induction motor. The fan is configured to assist inflow of air into the plurality of air ducts 170. In one embodiment, the plurality of blades of the fan are evenly spread to reduce acoustic noise during operation of the fan while maintaining overall mechanical balancing.

The induction motor is structurally optimised so that it may be safely used in electric vehicles with minimal structural stress and deformation. Present disclosure of specially designed induction motor meets the automotive requirements such as ability to bear shocks having an amplitude of 15 g, and 3 g continuous vibrations. Further the induction motor may be retrofitted with different electric vehicles for efficient use.

Present disclosure of irregular octagonal shaped motor casing enables fitting of the cooling channels and air ducts with minimal volume wastage. The design basically provides additional structural compactness for all the major motor components, thereby reducing stress and deformation problems. Thus, the present invention provides a compact design of the induction motor suitable for space management and low cost of fabrication. The induction motor also has an efficient thermal management due to the cooling channels and air ducts in the motor casing. Furthermore, due to irregular octagonal shape, the weight of the induction motor also gets reduced. Due to the present design, the eccentricity of the structure remains under control during operation while solving resonance problem associated with the existing motors. The characteristics of the present induction motor like reliability, power efficiency, better acoustics, high torque per ampere, high power and torque density and ruggedness makes it a suitable candidate to use in electric vehicles.

While specific language has been used to describe the disclosure, any limitations arising on account of the same are not intended. As would be apparent to a person skilled in the art, various working modifications may be made to the method in order to implement the inventive concept as taught herein.

The figures and the foregoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, order of processes described herein may be changed and are not limited to the manner described herein. Moreover, the actions of any flow diagram need not be implemented in the order shown; nor do all of the acts need to be necessarily performed. Also, those acts that are not dependant on other acts may be performed in parallel with the other acts. The scope of embodiments is by no means limited by these specific examples.

We claim:

1. An induction motor (10), comprising:
 a motor casing (20) comprising an irregular octagonal shape with a central open area and configured to house a cooling system within an outer wall (140) and an inner wall (130) of the motor casing (20), wherein the cooling system comprises a plurality of interconnected cooling channels (180) and a plurality of air ducts (170), wherein the motor casing (20) comprises a set of four side walls (160) and a set of four corner walls (150);
 a stator assembly (60) housed within the central open area of the motor casing (20), wherein the stator assembly (60) comprises:
  a hollow cylindrical stator stack (260) fabricated with a plurality of rectangular shaped open slots (280) on inner surface periphery and a plurality of cleating notches (290) on outer surface periphery; and
  a set of intertwined stator rods (250) configured as stator windings and housed within the plurality of rectangular shaped open slots (260);
 a rotor assembly (70) configured to be fitted inside the stator assembly (60); wherein the rotor assembly comprises:
  a hollow cylindrical rotor stack (350) fabricated with a plurality of predesigned rotor slots (380) on outer surface periphery, a plurality of vent holes (390) and a rectangular notch (400) of predefined dimension on inner surface periphery; and
  a set of rotor bars (360) configured as rotor windings and housed within the plurality of predesigned rotor slots (380);
 a shaft (80) configured to be fitted to the rotor assembly (70), wherein the shaft (80) comprises
  a rectangular depression (450) for proper alignment with the notch (400) on inner surface periphery of the rotor assembly (70); and one or more equispaced steps (440) on both axial ends for aligning mounted induction motor components; and
 a fan positioned on the first axial end of the induction motor (10) and configured to assist inflow of air into the plurality of air ducts (170).

2. The induction motor (10) as claimed in claim 1, wherein the set of four side walls (160) is fabricated to be elongated and thin, as compared to the set of four corner walls (150), to house the plurality of interconnected cooling channels (180) interposed axially.

3. The induction motor (10) as claimed in claim 1, wherein the plurality of interconnected cooling channels (180) is fabricated in a pre-designed meandering fashion to envelop the motor casing (20) and enable flow of coolant liquid to dissipate heat produced by the stator coils, wherein the plurality of interconnected cooling channels (180) is characterized on the outer wall (140) by a coolant liquid inlet valve (110) and a coolant liquid outlet valve (120), and wherein the plurality of interconnected cooling channels (180) is designed in a pre-defined shape with one or more vertical protrusions on base side.

4. The induction motor (10) as claimed in claim 1, wherein the coolant liquid comprises water and glycol in a ratio of 1:1.

5. The induction motor (10) as claimed in claim 1, wherein the pre-designed meandering fashion fabrication of the plurality of interconnected cooling channels (180) comprises helical loop fashion fabrication of the plurality of interconnected cooling channels (180) enveloping the motor casing (20).

6. The induction motor (10) as claimed in claim 1, wherein the set of four corner walls (150) is fabricated to be short and wide, as compared to the set of four side walls (160), to house the plurality of air ducts (170) interposed axially.

7. The induction motor (10) as claimed in claim 1, wherein each of the plurality of air ducts (170) is configured to envelop the motor casing (20) and cool the stator coil temperature and the rotor temperature by inflow and outflow of air, wherein the plurality of air ducts (170) is fabricated by a set of inflow air openings (210) on the inner wall (130) of the motor casing (20) first axial end and a set of outflow air openings (230) on the inner wall (130) of the motor casing (20) second axial end for inflow and outflow of air, and wherein the air exit from the set of outflow air openings (230) is circulated back into the plurality of air ducts (170) to the set of inflow air openings (210) via the plurality of vent holes (390).

8. The induction motor (10) as claimed in claim 1, wherein each of the plurality of rectangular shaped open slots (280) and each of the plurality of cleating notches (290) is equispaced and distributed around the hollow cylindrical stator stack (260), wherein two adjacent sides of each of the plurality of rectangular shaped open slots (280) is being fabricated with corresponding two v-shaped depressions (310) of pre-defined dimensions, and wherein each of the plurality of cleating notches (290) is fabricated with a c-shaped depression of pre-defined dimensions on the outer surface, and configured to align enveloping motor casing (20).

9. The induction motor (10) as claimed in claim 8, wherein each rod of the set of intertwined stator rods (250) is being aligned along the two v-shaped depressions (310) of each of plurality of rectangular shaped open slots (280).

10. The induction motor (10) as claimed in claim 1, wherein each of the plurality of predesigned rotor slots (380) and each of the plurality of vent holes (390) are equispaced and distributed around the hollow cylindrical rotor stack (350).

11. The induction motor (10) as claimed in claim 1, wherein the set of rotor bars (360) are interlocked with two rings to fit on both sides of the rotor assembly (70).

12. The induction motor (10) as claimed in claim 1, wherein the rectangular notch (290) is fabricated with a c-shaped depression of predefined dimensions and configured to align with the shaft (80) of the induction motor (20) corresponding to the rotor assembly (70).

13. The induction motor (10) as claimed in claim 1, wherein diameter of each of the one or more equispaced steps (440) corresponding to the shaft (80) increases with decrease in distance from both axial end of the induction motor (10).

14. The induction motor (10) as claimed in claim 1, wherein the plurality of blades of the fan (90) are unevenly spread to reduce acoustic noise during operation of the fan (90) while maintaining overall mechanical balancing.

15. The induction motor (10) as claimed in claim 1, wherein the induction motor is configured to produce high torque per ampere, and high power and torque density during operation.

\* \* \* \* \*